United States Patent

Kaule et al.

[11] Patent Number: 6,036,232
[45] Date of Patent: Mar. 14, 2000

[54] DATA CARRIER WITH AN OPTICALLY VARIABLE ELEMENT

[75] Inventors: Wittich Kaule, Emmering; Reinhard Plaschka, Münich, both of Germany

[73] Assignee: Giesecke & Devrient GmbH, Munich, Germany

[21] Appl. No.: 08/952,211

[22] PCT Filed: Mar. 20, 1997

[86] PCT No.: PCT/EP97/01411

§ 371 Date: Mar. 3, 1998

§ 102(e) Date: Mar. 3, 1998

[87] PCT Pub. No.: WO97/35732

PCT Pub. Date: Oct. 2, 1997

[30] Foreign Application Priority Data

Mar. 22, 1996 [DE] Germany .................... 196 11 383

[51] Int. Cl.[7] .................................................. B42D 15/02
[52] U.S. Cl. .............................................................. 283/85
[58] Field of Search ..................................... 283/113, 114, 283/72, 83, 86, 85, 91, 82; 428/915; 427/131

[56] References Cited

U.S. PATENT DOCUMENTS

| 5,265,916 | 11/1993 | Coe ........................................ 283/83 X |
| 5,354,099 | 10/1994 | Kaule et al. .............................. 283/83 |
| 5,388,862 | 2/1995 | Edwards ................................ 283/83 X |
| 5,599,047 | 2/1997 | Kaule et al. .......................... 283/83 X |

Primary Examiner—Willmon Fridie, Jr.
Attorney, Agent, or Firm—Bacon & Thomas, PLLC

[57] ABSTRACT

The invention relates to a data carrier, in particular bank note, paper of value, identity card or the like, having a security element disposed on the surface thereof. The data carrier is provided in at least one partial area with a background layer containing at least one authenticity feature. The optically variable element is applied to this background layer such that it overlaps the latter at least partly but does not completely cover it.

26 Claims, 2 Drawing Sheets

DATA CARRIER WITH AN OPTICALLY VARIABLE ELEMENT

BACKGROUND OF THE INVENTION

1. Field of the Invention

This invention relates to a data carrier, in particular a bank note, paper of value, identity card or the like, having a security element disposed on the surface thereof.

2. Background of the Invention

For protecting data carriers, in particular security documents, manufacturers provide these documents with additional security elements intended to authenticate them, on one hand, and to serve as protection from unauthorized reproduction of the data carrier, on the other hand. Along with a number of elements which have been produced by separate printing or other production processes, the use of optically variable elements which are applied to such data carriers have become widespread.

For detecting the authenticity of a document having a security element in the form of a reflection hologram consisting of an embossed layer of lacquer and a reflecting metal layer, it has been proposed for example in WO 94/11203 to use an adhesive layer with a fluorescent substance for applying the optical security element to the document. For detecting the authenticity of the document this fluorescent substance can be transferred to the document together with the optical security feature. However the fluorescent substance is only visible if openings are provided in the metal layer of the element so that the fluorescent substance is visible through the openings. Alternatively it has been proposed in WO 94/11203 that the document material be transparent so that the adhesive layer bearing the fluorescent substance is visible from the side facing away from the optical security element.

A disadvantage of the fluorescent adhesive known from WO 94/11203 is that it can only be applied in documents or optical security elements which fulfill special boundary conditions suitable for the adhesive. Specifically, the document material must either be transparent or the optical security element to be used must provide a view of the subjacent, fluorescent adhesive layer at least in partial areas. Another disadvantage is that the element could be detached and glued to a falsified document without this abuse being recognizable, since part of the fluorescent adhesive layer would still adhere to the element after its detachment and thus still provide a qualitatively correct authenticity signal, although it is quantitatively too small due to a lower fluorescence intensity. When authenticity elements are quickly tested, only the qualitative properties are usually evaluated, such as the presence of fluorescence or its wavelength, so that insufficient intensity of the signal does not enter into the detection of whether or not a document is authentic.

The problem to be solved is to provide a document with a security element wherein the security element on the document can be protected effectively without the document or security element having to meet special requirements of the type described.

BRIEF SUMMARY OF THE INVENTION

According to the invention a security element is protected by special pretreatment of the document material in the area of the element to be applied. This establishes a relation between document and element which permits attempted forgery to be prevented or at least easily discovered. In the simplest embodiment the pretreatment consists in applying a background layer provided with visually and/or machine detectable feature substances, the element being applied to the background layer such that the background layer is not covered by the element at least in a partial area and is thus freely accessible from outside. The feature substances can thus be detected unhindered in the uncovered area of the background layer with no need for special measures in the element layer structure or special document materials.

Furthermore the feature substances can provide information about the authenticity of the document material since they are not bound to the element and the layer structure thereof. If a luminescent substance is admixed to the background layer for example, a forgery consisting of copied document material and an authentic element can be ascertained very easily since the fluorescent substances cannot be rendered by a color copier, or at least not true to the original. This makes it possible not only to protect documents better from forgery or falsification but also to detect the originality of products and thus increase product assurance.

Machine testing of the element is likewise facilitated by the inventive combination of pretreating the document material and applying the security element to the pretreated area in overlapping fashion. Via the background layer provided with a machine detectable feature one can easily localize the area in which the element should be disposed. If the feature is additionally a feature which is shielded by the element, one can at the same time determine from the superficial extension of the feature substance whether the element is completely lacking or might be highly damaged.

In this way one can determine for example the fitness for circulation of a bank note provided with a hologram. If the background layer contains e.g. a fluorescent substance whose excitation and emission are prevented by the metal layer located within the hologram layer structure, the extension of the fluorescent surface increases when parts of the metal layer and thus the element layer structure are lacking. The fluorescent radiation also penetrates through cracks in the metal layer so that the fluorescence occurring in the element area is a measure of the condition of the element and the optical effect thereof. This can also be used to define a decision criterion for the bank note's fitness for circulation.

If the document material consists of paper with high surface roughness such as bank note paper, the element is preferably underlaid all over with the background layer, the superficial extension of the background layer being greater at least in one direction than the optically variable element applied to this surface. This not only produces additional protection from forgery for the document, but simultaneously avoids impairment of the optical impression of the element due to the surface roughness. As already described in EP 0 440 045 A2, the adverse effects of the document material surface quality can be avoided by mechanical smoothing in certain areas or by applying a smoothing background layer.

According to a further embodiment the background layer can also be applied to one or more layers already present on the document, e.g. primer layers. It can furthermore consist of different zones containing different feature substances. These zones can also overlap so that e.g. areas with mixed luminescences arise if different luminescent substances are used. The background layer can be doctored on, sprayed on with nozzles or printed with any printing process.

The added feature substances are preferably luminescent pigments. They have the advantage that they cannot be rendered by a copier, or not true to the original, and are therefore a very effective means of preventing forgery using color copying machines. Simultaneously the luminescent pigments can be easily detected with standard detectors and thus prove the authenticity of a document. If the emission wavelength is in the visible spectral region, the luminescent pigments can also serve as a visual authenticity feature which can be detected quickly and easily by illumination with a suitable excitation source.

However it is also possible to provide the background layer with other authenticity features. One can use in particular metallic pigments, weak pastel tones or pigments giving the primer layer a color which stands out only slightly from the color of the paper. One can further use magnetic, electrically conductive, radioactive substances or ones absorbent in the visible or invisible spectral region as well as interference layer pigments or liquid-crystal pigments.

BRIEF DESCRIPTION OF THE DRAWINGS

Further embodiments and advantages of the invention will be explained in the following with reference to the figures, the representation not being true to scale for clarity's sake.

DETAILED DESCRIPTION OF PREFERRED EMBODIMENTS OF THE INVENTION

Figure 1:
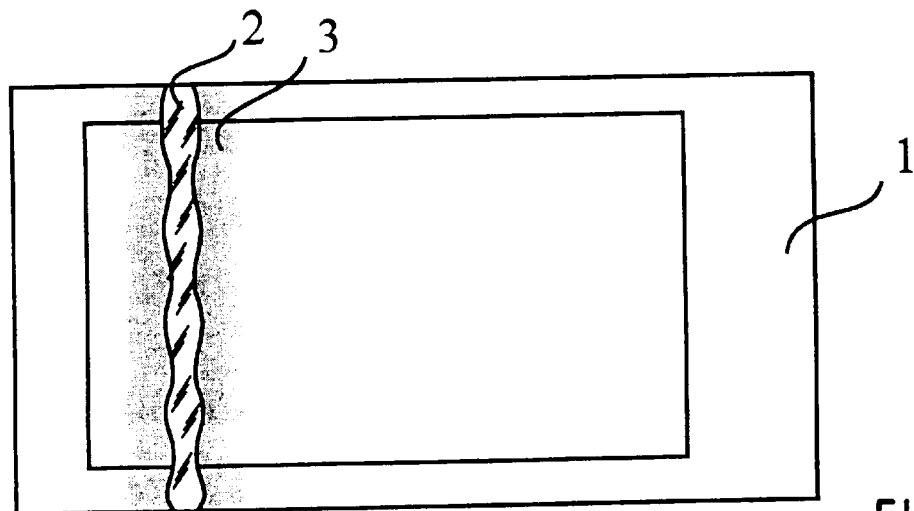
FIG. 1 shows a data carrier according to the invention.

FIG. 1 shows a data carrier in the form of bank note 1 having an optically variable stripe 2 applied as an endless element to the bank note. The data carrier material used can be paper, a fabric of natural and/or synthetic fibers or a plastic film. Optically variable stripe 2 has been applied to a surface area of the bank note which is formed in the present case by background layer 3 located all over under the optically variable element. This area cannot be rendered with a copier since background layer 3, which preferably consists of a layer of lacquer, has had luminescent substances mixed thereinto which cannot be transferred to the copy with the help of copying technology and are thus lacking in the copy. When the authenticity of the bank note is checked, for example with the help of a UV lamp or an authenticity sensor which can recognize the incorporated luminescent substance, the absence of this feature can be immediately recognized even if an attempt was made to reproduce optically variable element 2 or transfer authentic element 2 to a copy of bank note 1.

Instead of adding luminescent substances which can emit in the visible and/or invisible spectral region, one can also enrich the background layer 3 with other substances which prevent true reproduction of the bank note with the help of a copier. These include for example infrared-emitting or infrared-absorbent pigments. In addition one can use magnetic or conductive substances. It is especially suitable to use theremochromic or photochromic substances and substances for radioactively labeling the primer layer.

Although the background layer can basically be applied by all known methods, it is especially advantageous to apply it by screen printing, flexography or halftone photogravure. With this technology one can firstly adapt the contours of background layer 3 very exactly to the desired requirements. Furthermore one can print the background layer in such a way that it produces an additional optical effect.

Figure 2:
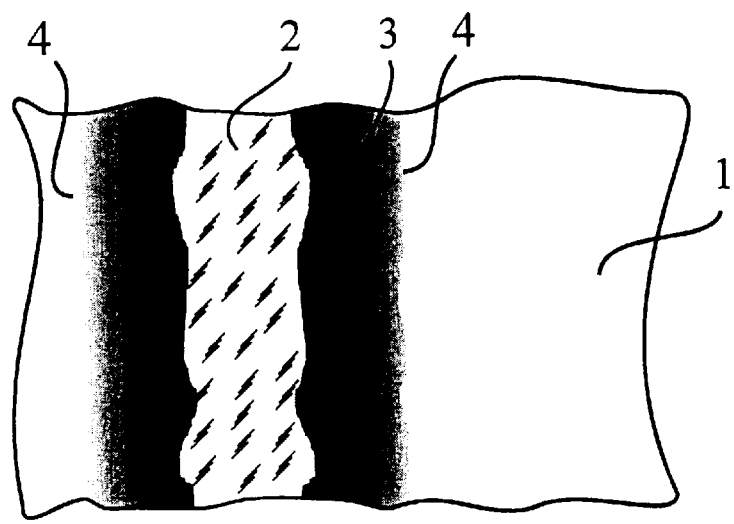
FIG. 2 shows an enlarged detail of the inventive data carrier in the area of the optically variable element.

FIG. 2 shows an example of this, indicating only a detail of inventive data carrier 1. Optically variable element 2 covers an area of data carrier 1 which is covered all over with background layer 3. The quantity of background layer material applied per surface unit decreases toward edges 4 of background layer 3 extending away from optically variable element 2, resulting in a diminishing-edge progressive pattern. This can be effected quite simply by screen printing, the progression being designed as a dot screen progression, line screen progression or pattern progression in which the number of patterns printed per surface unit decreases clearly toward the edge. The background layer covering can decrease continuously or in steps. Alternatively it is also possible to keep the quantity of background layer material constant over the entire area and vary only the concentration of the feature substance.

Figure 3:
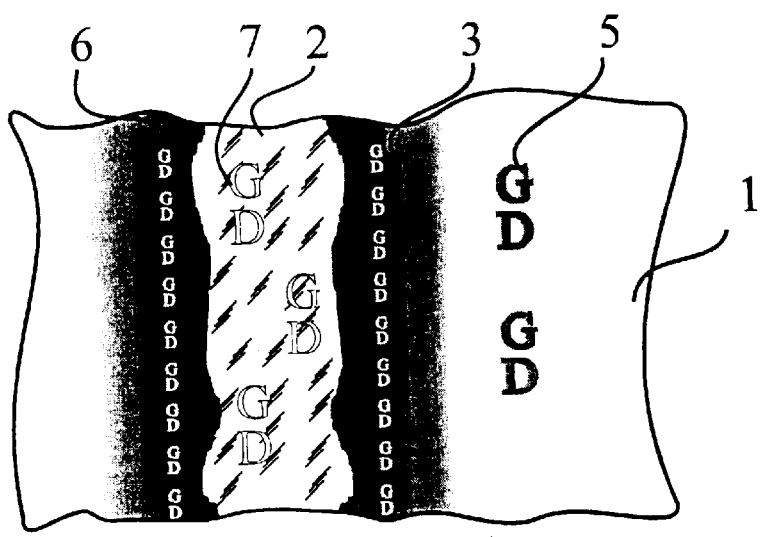
FIG. 3 shows a further embodiment of the inventive data carrier in an enlarged detail in the area of the optically variable element.

FIG. 3 shows a further embodiment of inventive data carrier 1 in an enlarged detail in the area of optically variable element 2. Optically variable element 2 is again a holographic stripe containing information 7 in the form of a diffractive relief structure which is visible from at least one viewing angle. In the present example information 7 consists of the letters "GD". As in the example of FIG. 4, the holographic stripe was applied to background layer 3 which has a diminishing-edge structure. However background layer 3 was printed such that information 7 present in the holographic stripe appears again in the background layer outside holographic stripe 2.

The size and design of information 6 is freely selectable. In the example shown in FIG. 3 the letters "GD" were repeated in a smaller form, but the arrangement and form of the characters is random and can be adapted to the particular needs. Characters 6 can be incorporated in background layer 3 by a positive or negative method. In the negative method background layer 3 is left out in the area of characters 6 so that the particular physical property of background layer 3 is not recognizable at this place. The color of background layer 3 preferably does not differ substantially from the color of the data carrier surface. If luminescent substances are thus mixed into background layer 3, this only becomes noticeable upon viewing of layer 3 under an exciting light source by the lack of otherwise present luminescence in the area of characters 6 so that characters 6 are readily recognizable against a luminescent background.

For positive representation of characters 6 one can apply an additional print to the background layer. The print can involve for example a second luminescent color differing from the color of the background. However other combinations are also possible in which the print is done for example with magnetic or other, abovementioned, suitable pigments or additives. Characters 6 can likewise be printed with a transparent or opaque ink covering the subjacent fluorescent substance at least partly. This results in manifold possibilities of combination for the person skilled in the art in designing the background to which the optically variable element is applied and furthermore providing it with a further print for security purposes. Positive representation of characters 6 can also be done differently. It is thus conceivable to leave out the background layer in an area of any desired shape, e.g. in the form of a rectangle, and represent characters 6 in this free area either with the same material as surrounding background layer 3 or with a different material.

A particular advantage of the embodiment shown in FIG. 3 is that this technique can provide a correspondence in information between data carrier 1 and optically variable element 2 applied to data carrier 1, thereby permitting identification of optically variable element 2 with data carrier 1.

For this purpose one can e.g. also conform information 7 in optically variable element 2 with further, corresponding information 5 applied to data carrier 1 at basically any place. Especially advantageous examples for bank notes are denomination, issuing office or other graphic elements coordinated with a certain value of a note. One can also provide triple rendition of information by repeating information 5 applied elsewhere to the document, e.g. the denomination, in background layer 3 and in the element (information 6,7).

According to a further variant one can also establish a correspondence between information visible from all viewing angles provided in the metal layer of optically variable element 2 and additional information 6 in background layer 3. Information 7 present in the metal layer can be produced e.g. by demetalizing, the information being represented as gaps or else as metallic characters in a demetalized zone. This information can be repeated in background layer 3.

Alternatively one can execute incorporated pieces of information 6 and 7 or information 6 and information 5 on the data carrier such that they supplement each other to form total information. In the latter embodiment one can include information 7 present in element 2. For this purpose the information present in element 2 can repeat or supplement one or more of the pieces of information present in the metal layer, the background layer or on the document, or the total information. In these embodiments the register between element 2 and background layer 3 or between information 6 in the background layer and information 5 on the data carrier must meet high requirements which are practically impossible for a counterfeiter to fulfill.

Information 6 applied additionally to, or left out of, background layer 3 can also be executed so as to be machine-readable and optionally also have a correspondence with optically variable element 2 applied. Information 6 can thus be applied, not as letters GD shown in FIG. 3, but in the form of binary codings or other machine-readable characters. For example the bank note denomination also present in the optically variable element could be applied as machine-readable information 6. One again has all the above-described possibilities for applying the additional information. It is of particular interest to use a magnetic coding which can be executed for example as a visible or invisible bar code.

Figure 4:
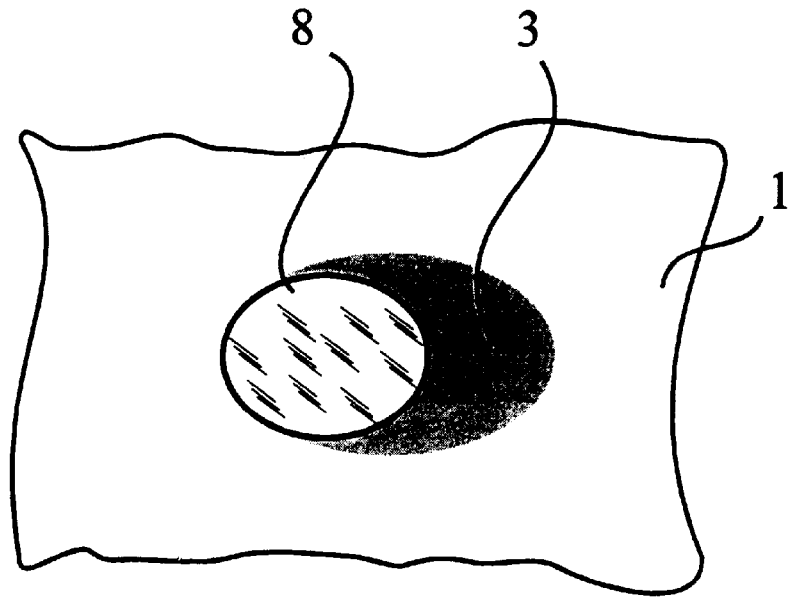
FIG. 4 shows the detail of an inventive data carrier in the area of an applied optically variable element.

Along with the hitherto described optically variable elements which are usually transferred to the document in the form of endless stripes by transfer technology, it is also possible to apply an optically variable element as a so-called single element. Such elements are located at a suitable place on the surface of the data carrier without connecting two edges of the data carrier. There are no restrictions on their shape. In particular these elements can be constituted by basic geometric structures such as circles, rectangles, polygons, or combinations thereof. The shape of the background layer is preferably coordinated with the shape of the element. FIG. 4 shows an example where in an area of data carrier 1, which is again shown enlarged, optically variable single element 8 is applied in partial area 3 of the data carrier which again has the desired properties. Depending on the shape and motif of optically variable element 8 the subjacent area can be adapted in shape and size according to the particular requirements.

Figure 5:
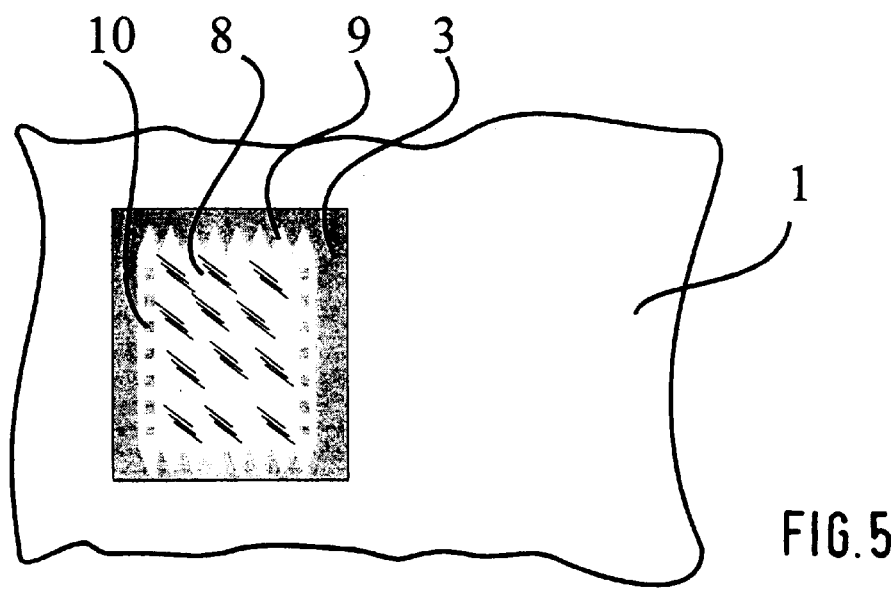
FIG. 5 shows a further embodiment of the inventive data carrier in an enlarged detail in the area of the optically variable element.

The optically variable element can also be produced directly on the document. In the case of a hologram, for example, this can be done by bringing a lacquer-coated embossing roll in contact with the document material and curing the lacquer during contact. One then provides this lacquer with a metal layer. However the metal layer can also be produced on the embossing roll and transferred together with the layer of lacquer (EP 0 563 992 A2). The edges of the area which face away from the optically variable element can have the same form as the edges of the optically variable element or be designed differently according to the particular requirements. Furthermore the edge design of element 2 or 8 can be executed so as to produce additional, difficultly imitable effects. For this purpose the edges can be executed for example as teeth 9 or patterns 10 covering area 3 only partly, as shown in a few examples in FIG. 5.

Figure 6:
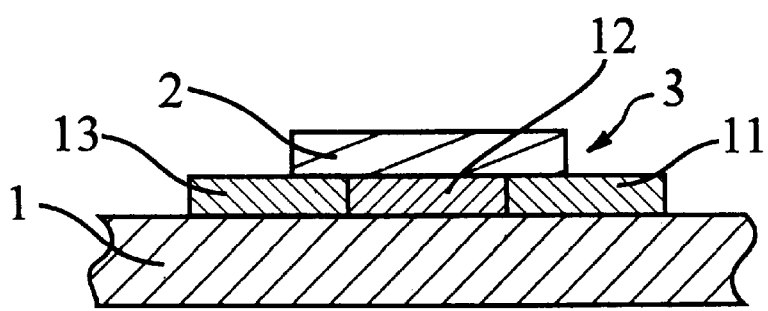
FIG. 6 shows a further embodiment of the inventive data carrier in the area of the element in cross section.

FIG. 6 shows an embodiment in which background layer 3 consists of several zones 11, 12, 13. Zones 11, 12, 13 differ primarily with regard to their physical properties. Different luminescent substances can thus exist in different zones 11, 12, 13 so that for example zone 13 fluoresces when excited in the red spectral region and zone 11 phosphoresces in the green. When the excitation is switched off the green emission of zone 11 persists for a certain time in this case, while the emission of the fluorescent substance in zone 13 ends when the excitation is switched off. Middle zone 12 can contain a further luminescent substance or another feature substance which becomes detectable for example only when element 2 has a certain degree of wornness due to breaks therein. Zone 12 could also be free of any feature substance if this appears suitable. Different zones 11, 12, 13 could likewise overlap at least partly to produce mixed effects.

Also one can dispose further layers under background layer 3. It is for example conceivable to apply a primer layer not pigmented with feature substances to the document for smoothing the surface, and the pigmented background layer only in a small partial area so that the element then applied overlaps the background layer but is not disposed completely thereon.

In the above-described examples it is also unnecessary for the background layer to be disposed under the element all over. It need only be freely accessible in at least one place.

Along with holograms one can use all other optically variable elements which convey different optical impressions from at least two different viewing angles. It is thus also within the scope of the invention to use optically variable inks, optically variable thin-layer films, cinegrams, pixelgrams, stereograms and other variants of holograms as well as volume holograms, iriodine prints or paliochromes as well as metal films or other metallic coatings with or without embossed structures. One can likewise use mere embossings of the substrate as optically variable elements which lead to an optically variable effect. The use of bronze inks or polymeric liquid-crystal inks is also within the range of the inventive possibilities.

Furthermore one can apply other security elements, i.e. ones which are not optically variable, to an inventive data carrier and protect them by the inventive method.

Although the invention has been described substantially in terms of protecting data carriers such as security documents, the inventive optically variable security elements are also suitable for protecting products, in particular products of high value. The inventive security element can be applied for example to merchandise labels, CDs or other articles of sale whose originality can be detected using the inventive security element. Such products are thus also to be regarded as data carriers in the sense of the invention.

We claim:

1. A data carrier with a surface, the surface being provided at least in a partial area with a background layer comprising at least one testable substance indicating authenticity of the data carrier, wherein the surface of the data carrier is provided with a security element and wherein the security element at least partially overlaps the background layer such that the background layer is not completely covered by the security element and the substance is still testable in the uncovered area of the background layer.

2. The data carrier of claim 1, wherein the security element is an optically variable element showing different optical images when viewed from at least two different viewing angles.

3. The data carrier of claim 1, wherein the security element entirely overlaps the background layer.

4. The data carrier of claim 1, wherein the background layer comprises at least two layers, each layer comprising a different testable substance.

5. The data carrier of claim 4, wherein the layers are disposed side by side.

6. The data carrier of claim 4, wherein the layers are disposed one over the other.

7. The data carrier of claim 4, wherein the layers are disposed partly overlapping each other.

8. The data carrier of claim 1, wherein at least one additional layer is disposed below the background layer.

9. The data carrier of claim 1, wherein the testable substance is selected from the group consisting of luminescent, metallic, magnetic, electrically conductive substances and optically variable pigments.

10. The data carrier of claim 1, wherein the quantity of the background layer per surface unit decreases with the distance from the security element.

11. The data carrier of claim 1, wherein the background layer comprises a predetermined concentration per surface unit of the testable substance and wherein the concentration per surface unit decreases as the distance of the background layer from the security element increases.

12. The data carrier of claim 1, wherein an information is provided in the area of the background layer not covered by the security element.

13. The data carrier of claim 12, wherein the information is provided in form of gaps in the background layer.

14. The data carrier of claim 12, wherein the information corresponds to an information on the document or the security element.

15. The data carrier of claim 12, wherein the information is provided in form of a code.

16. A method for producing a data carrier of claim 1, comprising the steps of: providing the data carrier at least in a partial area with a background layer comprising at least one testable substance indicating authenticity of the data carrier, and applying a security element to the background layer such that the security element at least partly overlaps the background layer but does not completely cover it and the substance is still testable in the uncovered area of the background layer.

17. The method of claim 16, including in the applying step, applying the security element entirely within the area of the background layer.

18. The method of claim 16, including forming the background layer of at least two layers, each layer comprising a different testable substance and applying the layers one over the other.

19. The method of claim 16, including forming the background layer of at least two layers, each layer comprising a different testable substance and applying the layers side by side or partly overlapping each other.

20. The method of claim 16, comprising applying the background layer by printing or doctoring on the background layer.

21. The method of claim 16, including applying the background layer by a process selected from the group consisting of screen printing, flexography and halftone photogravure.

22. The method of claim 16, including applying the security element to the data carrier by a transfer process.

23. The method of claim 16, including forming the security element on the data carrier by applying a lacquer layer to the surface of the data carrier, embossing the laquer layer with an embossing tool and curing the laquer layer during contact between the embossing tool and the laquer layer.

24. The method of claim 16, including forming the security element by embossing the data carrier.

25. The method of claim 16, including forming the security element by printing an optically variable ink on the surface of the data carrier.

26. A security paper with a surface, the surface being provided at least in a partial area with a background layer comprising at least one testable substance indicating authenticity of the security paper, wherein the surface of the security paper is provided with a security element and wherein the security element at least partially overlaps the background layer such that the background layer is not completely covered by the security element and the substance is still testable in the uncovered area of the background layer.

* * * * *